(12) United States Patent
Tatebayashi (10) Patent No.: US 7,788,931 B2
(45) Date of Patent: Sep. 7, 2010

(54) AIR-BLEED GAS TURBINE

(75) Inventor: Yasushi Tatebayashi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 49 days.

(21) Appl. No.: 12/213,831

(22) Filed: Jun. 25, 2008

(65) Prior Publication Data

US 2009/0000307 A1      Jan. 1, 2009

(30) Foreign Application Priority Data

Jun. 27, 2007    (JP) .............................. 2007-169393

(51) Int. Cl.
*F02C 6/04*     (2006.01)
*F02C 6/08*     (2006.01)

(52) U.S. Cl. .......................................... 60/785; 60/782

(58) Field of Classification Search .............. 60/782, 60/785

See application file for complete search history.

(56) References Cited

U.S. PATENT DOCUMENTS

| | | | | |
|---|---|---|---|---|
| 4,329,114 A | * | 5/1982 | Johnston et al. ............. | 415/145 |
| 4,711,084 A | * | 12/1987 | Brockett ..................... | 60/785 |
| 4,928,479 A | * | 5/1990 | Shekleton et al. ............. | 60/804 |
| 5,203,162 A | * | 4/1993 | Burge .......................... | 60/785 |
| 5,279,109 A | * | 1/1994 | Liu et al. ...................... | 60/785 |
| 5,351,478 A | * | 10/1994 | Walker et al. ................. | 60/785 |
| 6,048,171 A | * | 4/2000 | Donnelly et al. ............ | 415/145 |
| 6,438,941 B1 | * | 8/2002 | Elliott et al. ................ | 60/226.1 |

FOREIGN PATENT DOCUMENTS

| | | |
|---|---|---|
| JP | 11-200893 | 7/1999 |
| JP | 2000-356139 | 12/2000 |
| WO | WO 01/65095 | 9/2001 |

* cited by examiner

*Primary Examiner*—William H Rodriguez
*Assistant Examiner*—Gerald L Sung
(74) *Attorney, Agent, or Firm*—Finnegan, Henderson, Farabow, Garrett & Dunner, LLP (57) ABSTRACT

An air-bleed gas turbine includes a compressor; a combustor; a turbine; and an air bleed portion by which compressed air, which is supplied from the compressor to a circular space that surrounds the combustor, is partially supplied to a device outside the air-bleed gas turbine. The air bleed portion includes an air bleed passage that is communicated with an air bleed port which is connected to the device outside the air-bleed gas turbine, and a communication passage that is communicated with the circular space. The air bleed passage is communicated with the circular space through the communication passage. The flow passage area of the communication passage is increased as the distance from the air bleed port increases in the circumferential direction of the circular space.

8 Claims, 6 Drawing Sheets

AIR-BLEED GAS TURBINE

INCORPORATION BY REFERENCE

The disclosure of Japanese Patent Application No. JP2007-169393 filed on Jun. 27, 2007 including the specification, drawings and abstract is incorporated herein by reference in its entirety.

BACKGROUND OF THE INVENTION

1. Field of the Invention

The invention relates generally to a gas turbine, and, more specifically to an air-bleed gas turbine that includes air bleed means through which the compressed air, which is supplied from a compressor toward a combustor, is partially supplied to a device outside the gas turbine.

2. Description of the Related Art

An air-bleed gas turbine, which is one type of gas turbine, is in common use recently. The air-bleed gas turbine includes air bleed means, such as an air bleed port, an air bleed pipe, and an air bleed duct, through which the compressed air, supplied from a compressor toward a combustor, is partially supplied to a device outside the gas turbine.

Japanese Patent Application Publication No. 2000-356139 (JP-A-2000-356139) describes examples of the air-bleed gas turbine of the aforementioned type. FIG. 2 in JP-A-2000-356139 illustrates the configuration in which an air bleed port is communicated with a space in which a combustor that receives the compressed air from a compressor is housed. Further, FIG. 1 in JP-A-2000-356139 illustrates the configuration in which an air bleed port is communicated with a cavity that is separated from a space, in which the combustor is housed, by a partition. In this configuration, the compressed air is partially introduced through an air bleed hole formed in a diffuser of the compressor into the cavity which is communicated with the air bleed port.

In the air-bleed gas turbine configured as shown in FIG. 1 in JP-A-2000-356139, the compressed air from the compressor is supplied into the cavity through the air bleed hole formed in the diffuser, and then bled through the air bleed port from the cavity. This configuration makes it difficult to bleed a large amount of compressed air.

On the other hand, in the air-bleed gas turbine configured as shown in FIG. 2 in JP-A-2000-356139, a large amount of air may be bled through the air bleed port. However, with this configuration, there is a possibility that the pressure distribution of the compressed air that is supplied to the combustor is uneven because the pressure around the air bleed port decreases, resulting in unstable combustion in the combustor.

SUMMARY OF THE INVENTION

The invention provides an air-bleed gas turbine with which a large amount of compressed air, supplied under pressure from a compressor, is bled, and the compressed air is supplied to a combustor uniformly in the circumferential direction of the combustor.

An air-bleed gas turbine according to a first aspect of the invention includes: a compressor; a combustor; a turbine; and an air bleed portion by which compressed air, supplied from the compressor to a circular space that surrounds the combustor, is partially supplied to a device outside the air-bleed gas turbine. The air bleed portion includes: an air bleed passage that is communicated with an air bleed port which is connected to the device outside the air-bleed gas turbine; and a communication passage that is communicated with the circular space. The air bleed passage is communicated with the circular space through the communication passage. The flow passage area of the communication passage is increased as the distance from the air bleed port increases in the circumferential direction of the circular space.

In the first aspect of the invention, the communication passage may be formed of a plurality of communication passages, and flow passage areas of the communication passages may be set in such a manner that the communication passage that is at a longer distance from the air bleed port has a larger flow passage area.

In the air-bleed gas turbine according to the first aspect of the invention, the flow passage areas of the communication passages are set in such a manner that the communication passage that is at a longer distance from the air bleed port has a larger flow passage area. In other words, the flow passage area of the communication passage that is formed at a position closest to the air bleed port in the circumferential direction of the circular space is the smallest, and the flow passage area of the communication passage that is formed at a position farthest from the air bleed port in the circumferential direction of the circular space is the largest. Therefore, when the compressed air, which is delivered under pressure from the compressor to the circular space, is bled from the circular space through the communication passages and the air bleed passage into the air bleed port, the flow rate of the compressed air that flows into the communication passages is uniform in the circumferential direction of the circular space. Accordingly, the flow rate of the compressed air that will be supplied into the combustor is also uniform in the circumferential direction of the circular space, whereby the compressed air is supplied into the combustor uniformly in the circumferential direction of the combustor.

In the air-bleed gas turbine according to the first aspect of the invention, when the compressed air, which is delivered under pressure from the compressor to the circular space, is bled from the circular space through the communication passages and the air bleed passage into the air bleed port, the flow rate of the compressed air that flows into the communication passages is uniform in the circumferential direction of the circular space. Accordingly, the flow rate of the compressed air that will be supplied into the combustor is also uniform in the circumferential direction of the circular space.

An air-bleed gas turbine according to a second aspect of the invention includes: a compressor; a combustor; a turbine; and an air bleed portion by which compressed air, supplied from the compressor to a circular space that surrounds the combustor, is partially supplied to a device outside the air-bleed gas turbine. The air bleed portion has an air bleed passage that is communicated with an air bleed port which is connected to the device outside the air-bleed gas turbine. The flow passage area of the air bleed passage is larger at a portion at which the compressed air flows at a higher flow rate.

An air-bleed gas turbine according to a third aspect of the invention includes: a compressor; a combustor; a turbine; and an air bleed portion by which compressed air, supplied from the compressor to a circular space that surrounds the combustor, is partially supplied to a device outside the air-bleed gas turbine. The air bleed portion has an air bleed passage that is communicated with an air bleed port which is connected to the device outside the air-bleed gas turbine. The air bleed passage is configured in such a manner that a pressure loss of the compressed air is reduced as a distance from the air bleed port increases in the circumferential direction of the air bleed passage.

With the air-bleed gas turbines according to the aforementioned aspects of the invention, it is possible to bleed a large amount of compressed air, which is delivered under pressure from the compressor, into the air bleed port. Even in this case, it is still possible to supply the compressed air to the combustor uniformly in the circumferential direction of the combustor, whereby the combustion gas is produced in the combustor uniformly in the circumferential direction of the combustor. The uniformly produced combustion gas makes it possible to effectively and stably rotate the upstream turbine disk and the downstream turbine disk.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Hereinafter, air-bleed gas turbines according example embodiments of the invention will be described with reference to the attached drawings. In the description of the example embodiments, the same or similar constituent elements will be denoted by the same reference numerals, and the description thereof will not be repeated.

Figure 1:
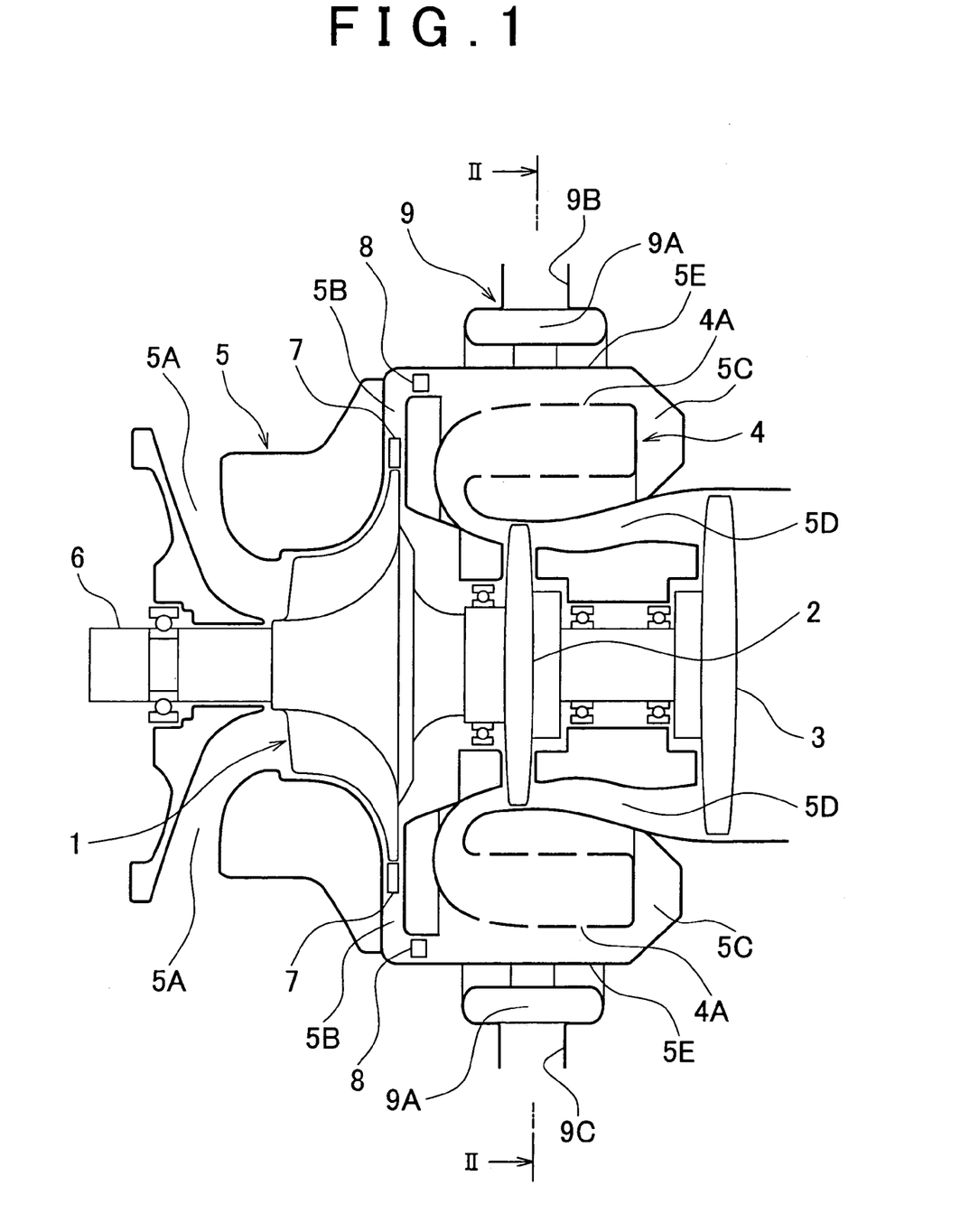
FIG. 1 is a longitudinal sectional view schematically showing the configuration of an air-bleed gas turbine according to a first embodiment of the invention.
Figure 2:
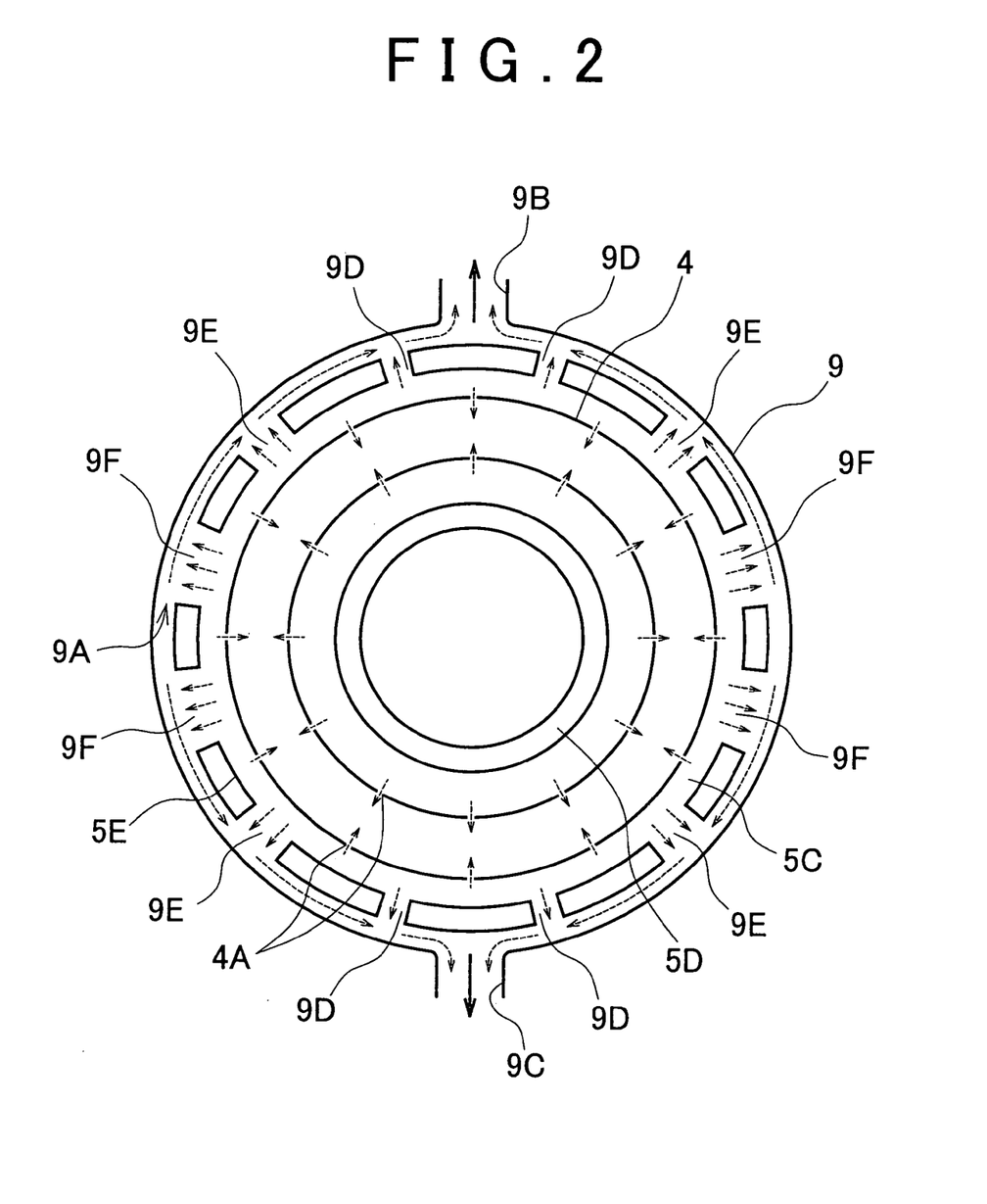
FIG. 2 is a sectional view taken along the line II-II in FIG. 1, showing the configuration of a main portion of the air-bleed gas turbine in FIG. 1.

An air-bleed gas turbine according to a first embodiment of the invention will be described with reference to FIGS. 1 and 2. FIG. 1 is a longitudinal sectional view schematically showing the configuration of the air-bleed gas turbine according to the first embodiment of the invention. FIG. 2 is a sectional view taken along the line II-II in FIG. 1, showing the configuration of a main portion of the air-bleed gas turbine in FIG. 1. As shown in FIG. 1, the air-bleed gas turbine according to the first embodiment of the invention includes a compressor impeller 1, an upstream turbine disk 2, a downstream turbine disk 3, and a combustor 4, which are all housed in a casing 5 indicated by thick lines in FIG. 1. The compressor impeller 1 functions as a centrifugal compressor by which the compressed air is delivered under pressure in the centrifugal direction. The upstream turbine disk 2 and the downstream turbine disk 3 together constitute an axial turbine that rotates the compressor impeller 1. The combustor 4 produces combustion gas that is used to rotate the upstream turbine disk 2 and the downstream turbine disk 3.

A plurality of blades (not shown) is provided on the outer periphery of the compressor impeller 1. Further, a plurality of blades (not shown) is provided on the outer periphery of the upstream turbine disk 2, and a plurality of blades (not shown) is provided on the outer periphery of the downstream turbine disk 3. The compressor impeller 1, the upstream turbine disk 2, and the downstream turbine disk 3 are coaxially fixed to a single shaft 6, which is rotatably supported by the casing 5 via bearings.

The combustor 4 is formed in a hollow donut shape and disposed around the upstream turbine disk 2. A plurality of compressed air inlet holes 4A is formed in the periphery of the combustor 4 in a manner such that the compressed air inlet holes 4A are evenly distributed in the circumferential direction of the combustor 4. In the combustor 4, the fuel that is injected from a fuel injection nozzle (not shown) is mixed with the compressed air that flows into the combustor 4 through the compressed air inlet holes 4A and the air-fuel mixture is ignited to be combusted.

The casing 5 has an air supply passage 5A and a compressed air passage 5B. The air is supplied to the compressor impeller 1 through the air supply passage 5A, and the compressed air is delivered under pressure from the compressor impeller 1 through the compressed air passage 5B in the centrifugal direction. A diffuser 7, which gradually increases the pressure of the compressed air, is provided in the upstream side of the compressed air passage 5B.

Further, a circular space 5C is formed in the casing 5. The donut-shaped combustor 4 is housed in the circular space 5C in such a manner that the combustor 4 is surrounded by the circular space 5C. The casing 5 also has a combustion gas delivery passage 5D through which the combustion gas produced in the combustor 4 is delivered under pressure toward the blades (not shown) provided on the outer peripheries of the upstream turbine disk 2 and the downstream turbine disk 3.

A downstream-side end portion of the compressed air passage 5B is bent toward the downstream side so that the cross section of the compressed air passage 5B is in an L-shape. A deswirl vane 8 is provided in the L-sectioned downstream-side end portion of the compressed air passage 5B. The deswirl vane 8 adjusts the swirl flow of the compressed air into a flow that proceeds straight toward the circular space 5C.

A cylindrical portion SE formed as a part of the casing 5 functions as the outer periphery of the circular space 5C around the combustor 4. Further, a duct structural body 9 is provided around the cylindrical portion SE. The compressed air, which is supplied to the circular space 5C, is partially supplied to a device outside the gas turbine through the duct structural body 9. The duct structural body 9 has a pair of cylindrical air bleed ports 9B and 9C that are communicated with a circular air bleed passage 9A (see FIG. 2). The air bleed ports 9B and 9C are disposed at positions opposite to each other in the circumferential direction of the circular air bleed passage 9A. It should be noted that the sectional shape of the air bleed passage 9A is not limited to a laterally long oval shape as shown in FIG. 1, and may be modified to any appropriate shape.

As shown in FIG. 2, the circular air bleed passage 9A formed in the duct structural body 9 is communicated with the circular space 5C within the cylindrical portion SE through a plurality of communication passages aligned along the circumferential direction of the circular air bleed passage 9A. The communication passages are, for example, divided into four groups, each of which includes three communication passages 9D, 9E and 9F. Two groups of communication passages out of four groups are near the air bleed port 9B, and the other two groups are near the air bleed port 9C.

The communication passages 9D, 9E and 9F of one of the two groups near the air bleed port 9B and the communication passages 9D, 9E and 9F of the other group near the air bleed port 9B are formed at positions that are symmetric with respect to the line connecting the air bleed port 9B to the air bleed port 9C. With this configuration, the compressed air is bled toward the air bleed port 9B efficiently. The communication passages 9D are formed at the positions that are closest to the air bleed port 9B among the positions of the communication passages 9D, 9E and 9F in the circumferential direction of the air bleed passage 9A. The communication passages 9F are formed at the positions that are farthest from the air bleed port 9B among the positions of the communication passages 9D, 9E and 9F in the circumferential direction of the air bleed passage 9A. The communication passages 9E are formed at positions between the communication passages 9D and the communication passages 9F.

Similarly, the communication passages 9D, 9E and 9F of one of the two groups near the air bleed port 9C and the communication passages 9D, 9E and 9F of the other group near the air bleed port 9C are formed at positions that are symmetric with respect to the line connecting the air bleed port 9B to the air bleed port 9C. With this configuration, the compressed air is bled toward the air bleed port 9C efficiently. The communication passages 9D are formed at the positions that are closest to the air bleed port 9C among the positions of the communication passages 9D, 9E and 9F in the circumferential direction of the air bleed passage 9A. The communication passages 9F are formed at the positions that are farthest from the air bleed port 9C among the positions of the communication passages 9D, 9E and 9F in the circumferential direction of the air bleed passage 9A. The communication passages 9E are formed at positions between the communication passages 9D and the communication passages 9F.

The backpressure is increased as the distance from the air bleed port 9B or 9C increases. Therefore, the communication passages 9D, 9E and 9F in each group are formed in such a manner that the flow passage area of the communication passage 9E is larger than that of the communication passage 9D, and the flow passage area of the communication passage 9F is larger than that of the communication passage 9E. In this way, the flow rate of compressed air bled from the circular space 5c through these communication passages 9D, 9E and 9F is uniform despite an increase in the backpressure with the distance from the air bleed port 9B or 9C. More specifically, each communication passage 9D, which is formed at the position that is closest to the air bleed port 9B or 9C in the circumferential direction of the air bleed passage 9A and at which the backpressure is low, has the smallest flow passage area, and each communication passage 9F, which is formed at the position that is farthest from the air bleed port 9B or 9C in the circumferential direction of the air bleed passage 9A and at which the backpressure is high, has the largest flow passage area. Each communication passage 9E, which is formed at the position between the communication passage 9D and the communication passage 9F, has the flow passage area that is between the flow passage area of the communication passage 9D and the flow passage area of the communication passage 9F.

The flow speed of the air that is bled through the communication passage 9F having the largest flow passage area into the air bleed passage 9A is lower than the flow speed of the air that is bled through the communication passage 9D having the smallest flow passage area into the air bleed passage 9A. Therefore, in order to equalize the flow speed of the bleed air throughout the air bleed passage 9A, the air bleed passage 9A is formed as a scroll passage in which the flow passage area is gradually increased from the mid points between the air bleed ports 9B and the air bleed ports 9C toward the air bleed ports 9B and 9C. It should be noted that the sectional shape of the air bleed passage 9A is not particularly limited. For example, the flow passage area of the air bleed passage 9A may be larger at a portion at which the compressed air flows at a higher flow rate. In particular, the air bleed passage 9A may be configured in a manner such that the flow passage area of the air bleed passage 9A is directly proportional to the flow rate of the compressed air.

In the thus configured air-bleed gas turbine according to the first embodiment of the invention, the air sucked from the air supply passage 5A is compressed and delivered under pressure to the compressed air passage 5B due to rotation of the compressor impeller 1 shown in FIG. 1. The pressure of the compressed air is gradually increased by the diffuser 7 disposed in the upstream side of the compressed air passage 5B. Then, the flow of the compressed air is adjusted by the deswirl vane 8 to a flow that proceeds straight toward the circular space 5C, and then supplied into the circular space 5C. The deswirl vane 8 is provided in the L-sectioned downstream-side end portion of the compressed air passage 5B.

As shown in FIG. 2, some compressed air supplied to the circular space 5C flows into the combustor 4 through the compressed air inlet holes 4A formed in the periphery of the combustor 4, and the remaining compressed air supplied to the circular space 5C flows into the air bleed passage 9A through the communication passages 9D, 9E and 9F in the duct structural body 9. Then, the compressed air that flows into the combustor 4 is used to ignite the fuel injected from the fuel injection nozzle (not shown) into the combustor 4 so that the injected fuel is combusted. On the other hand, the compressed air that flows into the air bleed passage 9A in the duct structural body 9 is bled to a device outside the gas turbine through the air bleed ports 9B and 9C.

The combustion gas that is produced in the combustor 4 is delivered under pressure through the combustion gas passage 5D to the blades (not shown) provided on the outer peripheries of the upstream turbine disk 2 and the downstream turbine disk 3. The combustion gas rotates the upstream turbine disk 2 and the downstream turbine disk 3, and the rotation of the turbine disks 2 and 3 rotates the compressor impeller 1 via the shaft 6.

As described above, the backpressure is increased as the distance from the air bleed port 9B or 9C increases. Therefore, the communication passages 9D, 9E and 9F in the duct structural body 9, which communicate with the circular space 5C, are formed in such a manner that the flow passage area of the communication passage 9E is larger than that of the communication passage 9D, and the flow passage area of the communication passage 9F is larger than that of the communication passage 9E. With this configuration, the flow rate of compressed air bled from the circular space 5c through these communication passages 9D, 9E and 9F is uniform despite an increase in the backpressure with the distance from the air bleed port 9B or 9C. Due to this configuration, the amount of air bled from the circular space 5C is uniform in the circumferential direction of the circular space 5C.

As a result, the flow rate of compressed air that is supplied to the combustor 4 is uniform in the circumferential direction of the circular space 5C, whereby the compressed air is supplied into the combustor 4 uniformly in the circumferential direction of the combustor 4. Therefore, the combustion gas is produced in the combustor 4 uniformly in the circumferential direction of the combustor 4, and the uniformly produced combustion gas makes it possible to stably and efficiently rotate the upstream turbine disk 2 and the downstream turbine disk 3.

On the other hand, the compressed air, which is supplied from the circular space 5C into the communication passages 9D, 9E and 9F in the duct structural body 9, flows at a constant flow speed through the air bleed passage 9A, which is configured as the scroll passage, toward the air bleed ports 9B and 9C. This reduces pressure loss of the compressed air that flows through the air bleed passage 9A toward the air bleed ports 9B and 9C, whereby a large amount of compressed air is bled through the air bleed ports 9B and 9C.

In other words, with the air-bleed gas turbine according to the first embodiment of the invention, it is possible to bleed a large amount of compressed air, which is delivered under pressure from the compressor impeller 1, through the air bleed ports 9B and 9C in the duct structural body 9. Even in this case, it is still possible to supply the compressed air into the combustor 4 uniformly in the circumferential direction of the combustor 4. As a result, the combustion gas is produced in the combustor 4 uniformly in the circumferential direction of the combustor 4. Uniformly produced combustion gas makes it possible to effectively and stably rotate the upstream turbine disk 2 and the downstream turbine disk 3.

Figure 3:
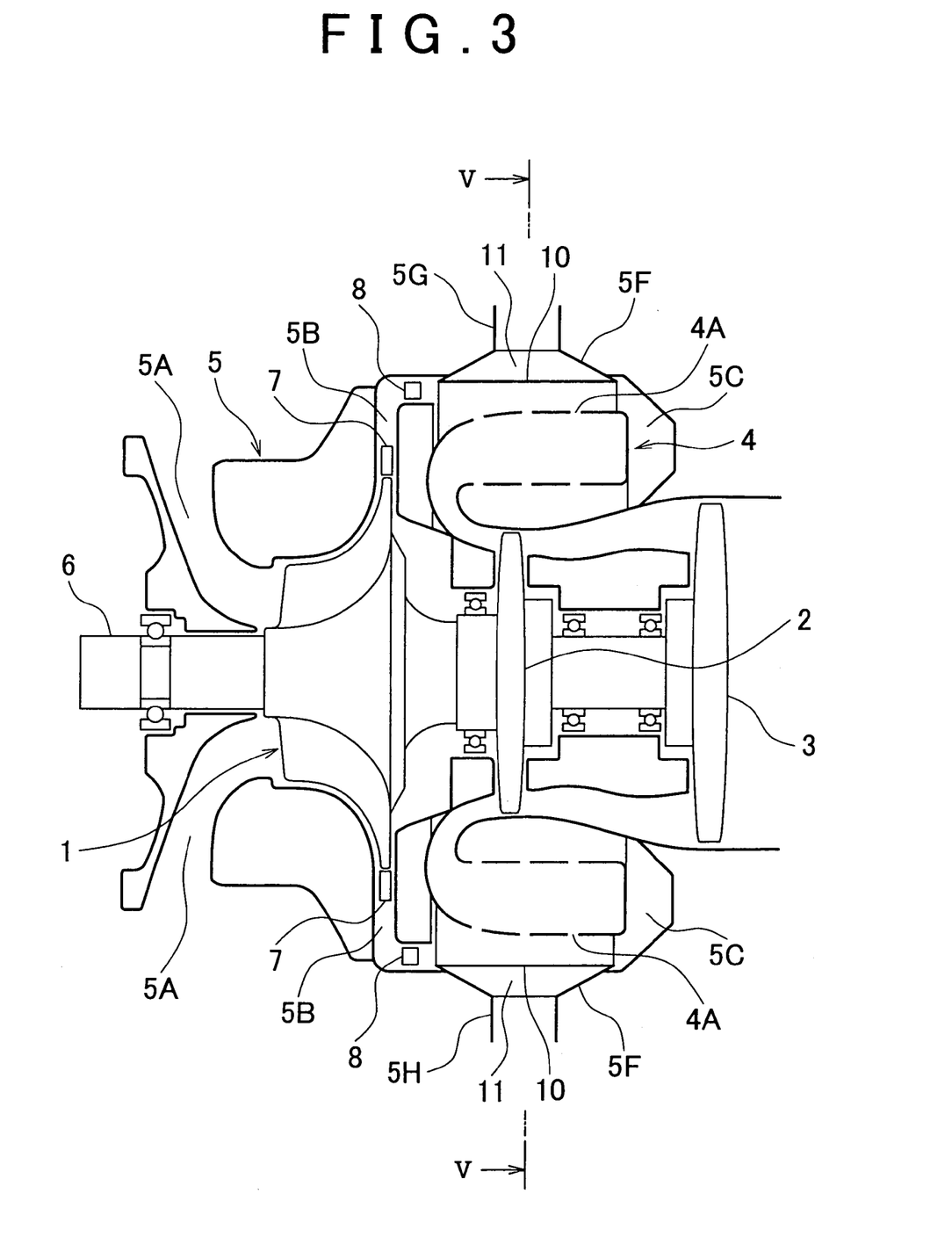
FIG. 3 is a longitudinal sectional view schematically showing the configuration of an air-bleed gas turbine according to a second embodiment of the invention.
Figure 4:
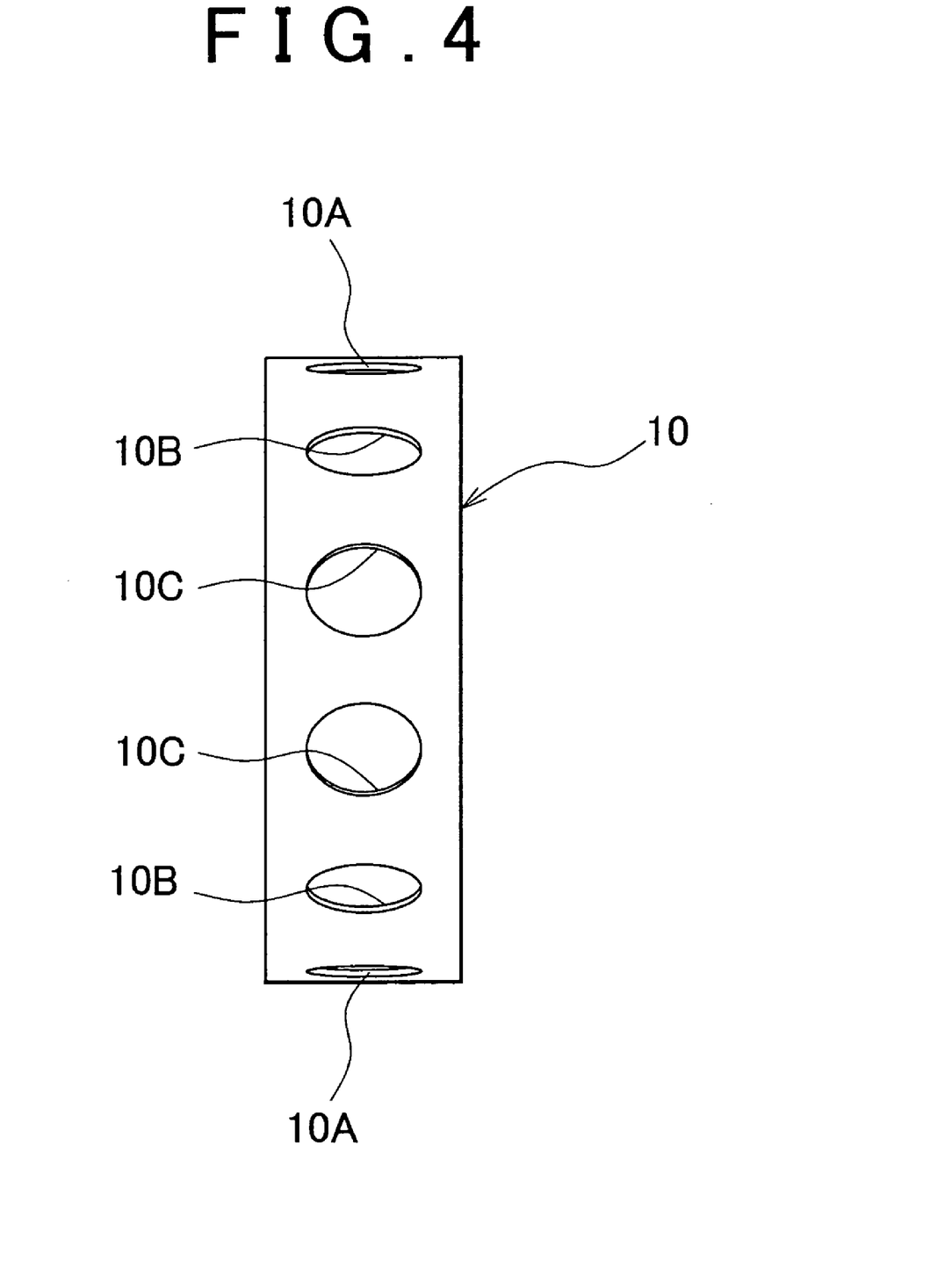
FIG. 4 is a side view showing a circular partition in FIG. 3.
Figure 5:
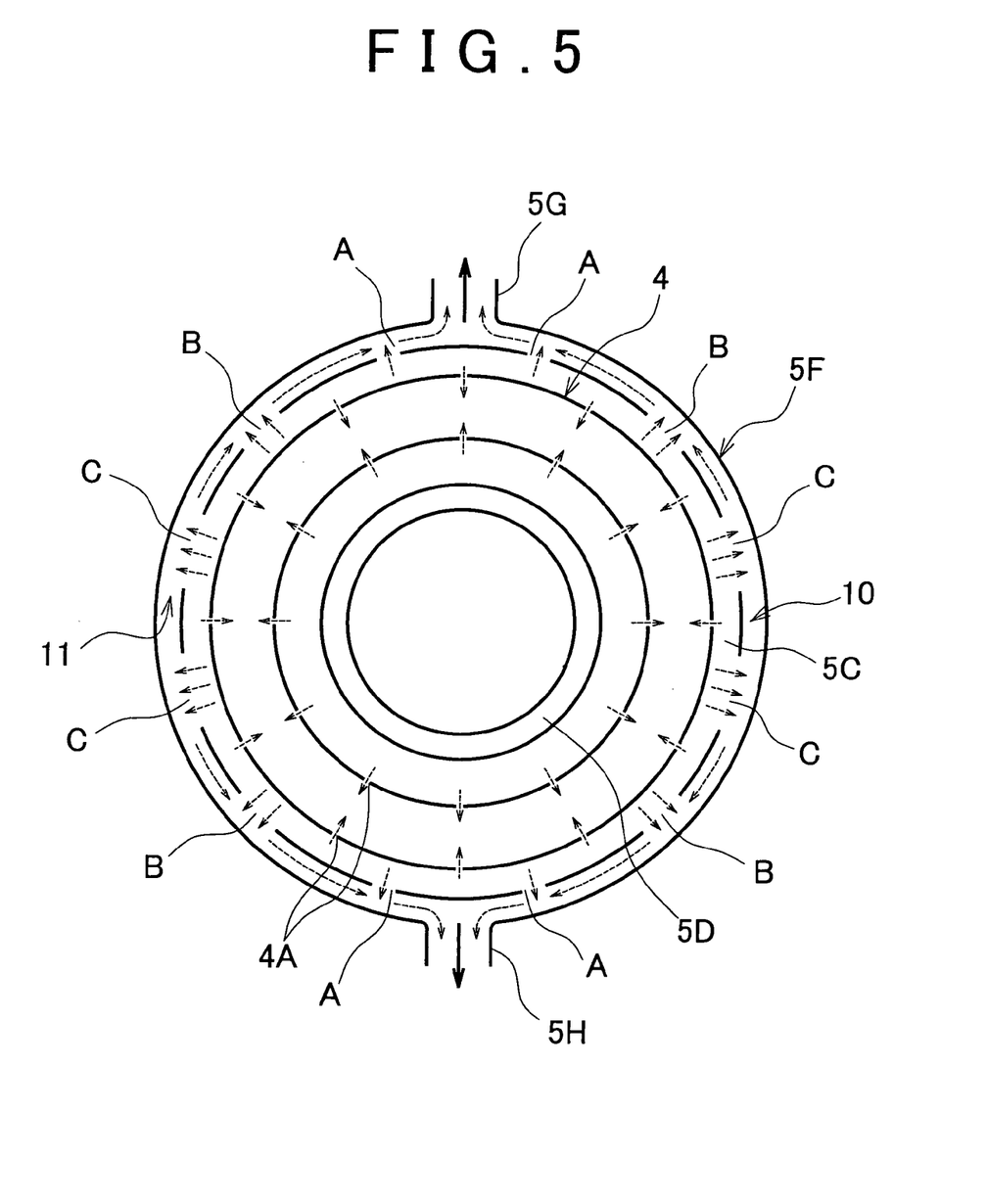
FIG. 5 is a sectional view taken along the line V-V in FIG. 3, showing a main portion of the air-bleed gas turbine in FIG. 3.

Next, an air-bleed gas turbine according to a second embodiment of the invention will be described with reference to FIGS. 3 to 5. FIG. 3 is a longitudinal sectional view schematically showing the configuration of the air-bleed gas turbine according to the second embodiment of the invention. FIG. 4 is a side view showing a circular partition shown in FIG. 3. FIG. 5 is a sectional view taken along the line V-V in FIG. 3, showing a main portion of the air-bleed gas turbine shown in FIG. 3. In place of the duct structural body 9 in the air-bleed gas turbine according to the first embodiment of the invention, a circular partition 10 is provided in the air-bleed gas turbine according to the second embodiment of the invention. It should be noted that the other structural members are basically the same as those in the air-bleed gas turbine according to the first embodiment of the invention, and the detailed description thereof will be omitted.

As shown in FIG. 3, a circular projection portion 5F formed as a part of the casing 5 functions as the outer periphery of the circular space 5C around the combustor 4. A pair of cylindrical air bleed ports 5G and 5H are formed at positions opposite to each other in the circumferential direction of the circular projection portion 5F. The circular partition 10 is provided inside the circular projection portion 5F, and a circular air bleed passage 11 having a trapezoidal section is formed between the circular partition 10 and the circular projection portion 5F.

As shown in FIG. 4, the circular partition 10 has a plurality of communication holes 10A, 10B and 10C in the circumferential direction of the circular partition 10. As shown in FIG. 5, the communication holes 10A, 10B and 10C formed in the circular partition 10 are used as communication passages A, B, and C, respectively, which provide communication between the circular space 5C and the circular air bleed passage 11.

The communication passages A, B and C shown in FIG. 5 correspond to the communication passages 9D, 9E and 9F in the duct structural body 9 in the air-bleed gas turbine according to the first embodiment of the invention shown in FIG. 2.

More specifically, as shown in FIG. 5, each communication passage A, which corresponds to the communication hole 10A and has the smallest opening area among the communication passages A, B and C, is formed at the position corresponding to the position at which the communication passage 9D, shown in FIG. 2, having the smallest flow passage area is formed. Each communication passage C, which corresponds to the communication hole 10C and has the largest opening area among the communication passages A, B and C, is formed at the position corresponding to the position at which the communication passage 9F, shown in FIG. 2, having the largest flow passage area is formed. Each communication passage B, which corresponds to the communication hole 10B and has the opening area between the opening areas of the communication passage A and the communication passage B, is formed at the position corresponding to the position at which the communication passage 9E, shown in FIG. 2, having the flow passage area between the flow passage areas of the communication passage 9D and the communication passage 9F is formed.

Further, the circular air bleed passage 11 is formed as a scroll passage in which the flow passage area is gradually increased from the mid points between the air bleed ports 5G and 5H toward the air bleed ports 5G and 5H, as in the configuration of the circular air bleed passage 9A shown in FIG. 2. It should be noted that the sectional shape of the air bleed passage 11 is not particularly limited. For example, the flow passage area of the air bleed passage 11 may be increased at a portion at which the compressed air flows at a higher flow rate. In particular, the air bleed passage 11 may be configured in a manner such that the flow passage area of the air bleed passage 11 is directly proportional to the flow rate of the compressed air.

In the thus configured air-bleed gas turbine according to the second embodiment of the invention, when the compressed air is supplied into the circular space 5C due to rotation of the compressor impeller 1 shown in FIG. 3, some of the supplied compressed air is supplied into the combustor 4 through the compressed air inlet holes 4A, and the remaining compressed air is supplied into the circular air bleed passage 11 through the communication passages A, B, C, and is bled to a device outside the gas turbine through the air bleed ports 5G and 5H, as shown in FIG. 5.

As described above, the backpressure is increased as the distance from the air bleed port 9B or 9C increases. That is, the backpressure around the communication passage B is higher than that around the communication passage A, and the backpressure around the communication passage C is higher than that around the communication passage B. Therefore, the communication passages A, B and C are formed in such a manner that the flow passage area of the communication passage B is larger than that of the communication passage A, and the flow passage area of the communication passage C is larger than that of the communication passage B. With this configuration, the flow rate of compressed air bled from the circular space 5c through these communication passages A, B and C is uniform despite an increase in the backpressure with the distance from the air bleed port 9B or 9C. Due to this configuration, the amount of air bled from the circular space 5C is also uniform in the circumferential direction of the circular space 5C.

As a result, the flow rate of the compressed air that will be supplied to the combustor 4 is uniform in the circumferential direction of the circular space 5C, whereby the compressed air is supplied to the combustor 4 uniformly in the circumferential direction of the combustor 4. Therefore, the combustion gas is produced in the combustor 4 uniformly in the circumferential direction of the combustor 4, and the uniformly produced combustion gas makes it possible to stably and efficiently rotate the upstream turbine disk 2 and the downstream turbine disk 3.

On the other hand, the compressed air that is supplied from the circular space 5C into the communication passages A, B and C flows at a constant flow speed through the air bleed passage 11, which is configured as the scroll passage, toward the air bleed ports 9B and 9C. This reduces pressure loss of the compressed air that flows through the air bleed passage 9A toward the air bleed ports 9B and 9C, whereby a large amount of compressed air is bled through the air bleed ports 9B and 9C.

In other words, with the air-bleed gas turbine according to the second embodiment of the invention, it is possible to bleed a large amount of compressed air, which is delivered under pressure from the compressor impeller 1, through the air bleed ports 9B and 9C. Even in this case, it is still possible to supply the compressed air into the combustor 4 uniformly in the circumferential direction of the combustor 4. As a result, the combustion gas is produced in the combustor 4 uniformly in the circumferential direction of the combustor 4. The uniformly produced combustion gas makes it possible to effectively and stably rotate the upstream turbine disk 2 and the downstream turbine disk 3.

The air-bleed gas turbine according to the invention is not limited to the embodiments described above. For example, the communication holes 10A, 10B and 10C in the circular partition 10 shown in FIG. 4 may be replaced with a large number of small holes. In this case, the small holes have different opening diameters, or are formed in different densities of distribution so that the flow rate of the bleed air that flows through these small holes is uniform in the circumferential direction of the circular partition 10.

Figure 6:
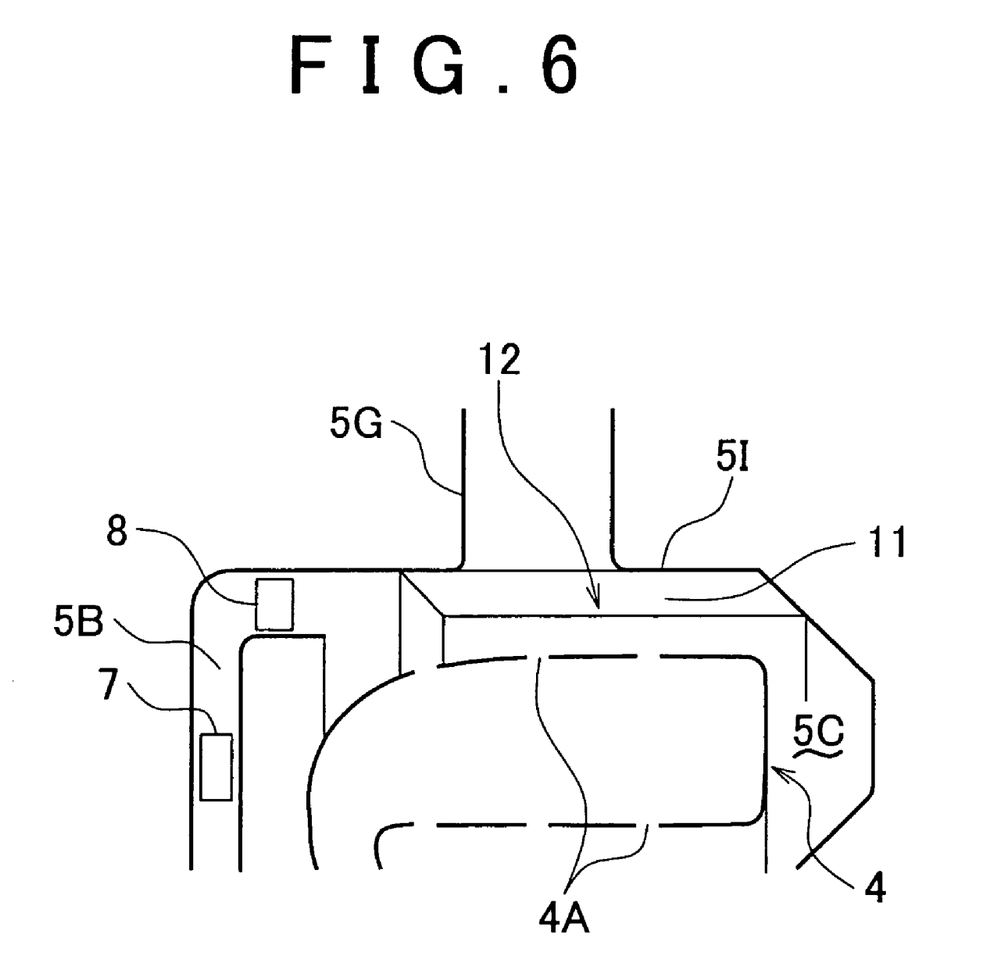
FIG. 6 is a partially enlarged sectional view showing a modification example of a circular projection portion of a casing in FIG. 3.

Further, the circular projection portion 5F of the casing 5 shown in FIG. 3 may be replaced with, for example, a cylindrical portion 5I shown in FIG. 6 without any projection portion. In this case, a circular partition 12 having a bent sectional shape is provided inside the cylindrical portion 5I so as to form the air bleed passage 11 between the cylindrical portion 5I and the circular partition 12.

The air-bleed gas turbines according to the first and second embodiments of the invention include the communication passages 9D, 9E and 9F, and the communication passages A, B and C, respectively. However, the invention is not limited to these configurations. The air-bleed gas turbine may be configured without the communication passages 9D, 9D and 9F (A, B and C), and may be configured in such a manner that the sectional area of the air bleed passage 9A (11) is gradually increased from the mid points between the air bleed ports 9B and 9C (5G and 5H) toward the air bleed ports 9B and 9C (5G and 5H) so as to function as the scroll passage. In this way, the flow rate of compressed air supplied to the combustor 4 is uniform in the circumferential direction of the circular space 5C.

Further, the air-bleed gas turbine according to the invention may have any configuration as long as the communication passages 9D, 9E and 9F (A, B and C) and/or the air bleed passage 9A (11) are configured in such a manner that the pressure loss of the compressed air is reduced as the distance from the air bleed port 9B or 9C (5G or 5H) increases in the circumferential direction of the circular space 5C.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. An air-bleed gas turbine, comprising:
   a compressor;
   a combustor;
   a turbine; and
   an air bleed portion by which compressed air, which is supplied from the compressor to a circular space that surrounds the combustor, is partially supplied to an outside of the air-bleed gas turbine,
   wherein the air bleed portion comprises an air bleed passage, the air bleed passage is communicated with an air bleed port, and the air bleed passage is communicated with the circular space via a plurality of communication passages; and
   wherein a flow passage area of each of the plurality of the communication passages is gradually increased as a distance from the air bleed port increases in a circumferential direction of the circular space.

2. The air-bleed gas turbine according to claim 1, wherein a casing that defines the circular space is provided with a duct structural body that has the air bleed port, the air bleed passage, and the plurality of the communication passages.

3. The air-bleed gas turbine according to claim 1, wherein:
   the air bleed port is formed in a casing that defines the circular space;
   the air bleed passage that is communicated with the air bleed port is formed between the casing and a circular partition that is provided inside the casing; and
   the circular partition has a plurality of communication holes used as the plurality of the communication passages.

4. The air-bleed gas turbine according to claim 3, wherein:
   the casing includes a circular projection portion that has the air bleed port, and
   the air bleed passage is formed between the circular projection portion and the circular partition.

5. The air-bleed gas turbine according to claim 1, wherein the air bleed passage is formed as a scroll passage in which a flow rate of the compressed air that flows toward the air bleed port is uniform.

6. The air-bleed gas turbine according to claim 2, wherein the air bleed passage is formed as a scroll passage in which a flow rate of the compressed air that flows toward the air bleed port is uniform.

7. The air-bleed gas turbine according to claim 3, wherein the air bleed passage is formed as a scroll passage in which a flow rate of the compressed air that flows toward the air bleed port is uniform.

8. The air-bleed gas turbine according to claim 4, wherein the air bleed passage is formed as a scroll passage in which a flow rate of the compressed air that flows toward the air bleed port is uniform.

* * * * *